US012105452B2

(12) United States Patent
Li

(10) Patent No.: US 12,105,452 B2
(45) Date of Patent: Oct. 1, 2024

(54) METHOD AND APPARATUS OF HEATING CONTROL, IMAGE FORMING DEVICE, AND STORAGE MEDIUM

(71) Applicant: Zhuhai Pantum Electronics Co., Ltd., Zhuhai (CN)

(72) Inventor: Ronghua Li, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 26 days.

(21) Appl. No.: 18/164,564

(22) Filed: Feb. 3, 2023

(65) Prior Publication Data

US 2023/0185220 A1 Jun. 15, 2023

Related U.S. Application Data

(63) Continuation of application No. PCT/CN2021/110222, filed on Aug. 3, 2021.

(30) Foreign Application Priority Data

Aug. 5, 2020 (CN) ........................ 202010778662.7

(51) Int. Cl.
*G03G 15/20* (2006.01)
*G03G 15/00* (2006.01)

(52) U.S. Cl.
CPC ....... *G03G 15/205* (2013.01); *G03G 15/5004* (2013.01); *G03G 2215/2038* (2013.01)

(58) Field of Classification Search
CPC ............ G03G 15/205; G03G 15/5004; G03G 2215/2038
See application file for complete search history.

(56) References Cited

U.S. PATENT DOCUMENTS 6,008,829 A * 12/1999 Wakamiya ........... G03G 15/205
347/156
2014/0205306 A1 7/2014 Miyamae
2020/0103795 A1 4/2020 Isono et al.

FOREIGN PATENT DOCUMENTS

CN 101013198 A 8/2007
CN 101097433 A 1/2008
(Continued)

OTHER PUBLICATIONS

JP_2000330418_A_t Machine Translation, Japan, 2000, Fujiwara.*
(Continued)

*Primary Examiner* — Carla J Therrien
(74) *Attorney, Agent, or Firm* — ANOVA LAW GROUP PLLC

(57) ABSTRACT

Method of heating control includes preheating a heater to a first target temperature when an image forming device is powered on, is woken up from sleep, or receives a task to be processed; determining a voltage parameter of the heater or a characteristic of temperature change of a heating process of the heater, under the current environment of the power supply, according to a prior-preheating temperature, a post-preheating temperature, and a time length of the preheating; and according to the voltage parameter or the characteristic of temperature change under the current environment of the power supply, determining a heating start time of a second heating for the preheated heater and triggering the second heating at the heating start time, to allow a temperature of the heater to reach a second target temperature within a set time before an image to-be fixed arrives at the fixing assembly.

11 Claims, 5 Drawing Sheets

(56) References Cited

FOREIGN PATENT DOCUMENTS

| | | | |
|---|---|---|---|
| CN | 102681409 | A | 9/2012 |
| CN | 104932237 | A | 9/2015 |
| CN | 108800595 | A | 11/2018 |
| CN | 110547508 | A | 12/2019 |
| CN | 110716407 | A | 1/2020 |
| CN | 210626884 | U | 5/2020 |
| CN | 111781811 | A | 10/2020 |
| JP | 2000330418 | A | 11/2000 |
| JP | 2001236126 | A | 8/2001 |
| JP | 2005031633 | A | 2/2005 |
| JP | 2008134377 | A | 6/2008 |

OTHER PUBLICATIONS

The World Intellectual Property Organization (WIPO) International Search Report for PCT/CN2021/110222 Oct. 26, 2021 6 Pages (including translation).

* cited by examiner

METHOD AND APPARATUS OF HEATING CONTROL, IMAGE FORMING DEVICE, AND STORAGE MEDIUM

CROSS-REFERENCE TO RELATED APPLICATION

This application is a continuation of International Application No. PCT/CN2021/110222, filed on Aug. 3, 2021, which claims priority to Chinese Patent Application No. 202010778662.7, filed Aug. 5, 2020, the entire content of which is incorporated herein by reference.

TECHNICAL FIELD

The present disclosure relates to the field of image printing technology and, in particular, to a method and an apparatus of heating control, an image forming device, and a storage medium.

BACKGROUND

A printer has a fixing operation in a printing process. Specifically, when a sheet of paper is delivered to a nip area of the fixing assembly, a toner is melted by the heat on the surface of the heat roller and adhered to the paper by a pressure of a pressure roller. A heating voltage of fixing is provided by the common utility power, which is connected to the printer, without being processed by any operations of a power board. Thus, the heating voltage has fluctuations.

In the presence of the voltage fluctuations, the fixing operations have the following issues. When the voltage is too low, the heating time will be longer. When the paper enters the nip area of the fixing assembly, a target temperature of heating is not achieved, causing unfirm fixing. When the voltage is too high, the heating time will be shorter. Before the paper enters the nip area of the fixing assembly, the target temperature of heating has been achieved for a long time. When the paper enters the nip area of fixing, image ghosting appears.

SUMMARY

Embodiments of the present disclosure provide a method and an apparatus of heating control, an image forming device, and a storage medium. The disclosed method of heating control provided by the embodiments of the present disclosure can be applied to an image forming device to determine a characteristic of temperature change of a heater under a current environment of a power supply during heating process or to determine a voltage parameter of a current power supply. Based on the determined characteristic of temperature change or the voltage parameter of the current power supply, the method determines a heating start time of a second heating for a preheated heater. The heating start time of the second heating is real-time adjusted in each fixing operation according to the change of the actual voltage, which addresses the issues of unfirm fixing and image ghosting mentioned in the Background section.

Embodiments of the present disclosure provide a method of heating control, applied to the image forming device. The image forming device includes a fixing assembly and a power source for supplying power to the fixing assembly. The fixing assembly has a heater and a sensor that detects the temperature of the fixing assembly. The method includes: when the image forming device is powered on, is woken up from sleep, or receives a task to be processed, preheating the heater to a first target temperature; determining the characteristic of temperature change of the heater during the heating process under the current environment of the power supply or the voltage parameter of the current power supply; and according to the characteristic of temperature change or the voltage parameter of the current power supply, determining the heating start time of the second heating for the preheated heater, triggering the second heating at the heating start time, allowing the heater to reach a second target temperature before an image to-be-fixed arrives at the fixing assembly.

Further, determining the voltage parameter of the heater under the current environment of the power supply includes: determining a heating time length $t_1$, corresponding to any temperature range in the heating process of the heater under the current environment of the power supply and a temperature difference $\Delta T_1$ between a start temperature $T_{N1}$ and an end temperature $T_{N2}$ of the temperature range; and determining the voltage parameter under the current environment of the power supply according to the heating time length $t_1$ and the temperature difference $\Delta T_1$ of the temperature range.

Further, determining the heating start time of the second heating of the preheated heater according to the voltage parameter includes: determining a moving time length $t_2$ of moving the image to-be-fixed to the fixing assembly; determining a heating time length $t_3$ of the second heating of the heater from a current temperature after being preheated to the second target temperature; and determining the heating start time of the second heating according to a correlation between the heating time length $t_3$ of the second heating and the moving time length $t_2$ of moving the image to-be-fixed.

Further, determining the heating time length $t_3$ of the second heating of the heater from the current temperature after being preheated to the second target temperature includes: determining a temperature difference $\Delta T_2$ between the second target temperature and the current temperature after the heater is preheated; and determining the heating time length $t_3$ of heating the heater from the current temperature after being preheated to the second target temperature according to the temperature difference $\Delta T_2$, when the heater is at the voltage parameter under the current environment of the power supply.

Further, determining the characteristic of temperature change of the heating process of the heater under the current environment of the power supply according to the prior-preheating temperature, the post-preheating temperature, and the corresponding time length of preheating includes: determining the heating time length $t_1$, corresponding to the any temperature range in the heating process of the heater under the current environment of the power supply and the temperature difference $\Delta T_1$ between the start temperature $T_{N1}$ and the end temperature $T_{N2}$ of the temperature range; and matching a pre-stored table or a pre-stored simulation curve in a database with a current voltage feature according to the temperature difference $\Delta T_1$ between the start temperature $T_{N1}$ and the end temperature $T_{N2}$ of the temperature range, and using the matched pre-stored table or matched pre-stored simulation curve as the characteristic of the temperature change. The pre-stored table is configured to store each temperature range and corresponding heating time length during the heating process of the heater under different environments of the power supply. The pre-stored simulation curve is a temperature change curve of the heater being heated under different environments of the power supply. Further, according to the characteristic of temperature change, determining the heating start time of the second heating for the preheated heater includes: determining a moving time length $t_2$ of moving the image to-be-fixed to the fixing assembly; determining a heating time length $t_3$ of heating the preheated heater from the current temperature to the second target temperature according to the matched pre-stored table or the matched pre-stored simulation curve; and determining the heating start time according to a correlation between the heating time length $t_3$ of the second heating and the moving time length $t_2$.

Further, determining the heating start time according to a correlation between the heating time length $t_3$ of the second heating and the moving time length $t_2$ includes: establishing a time axis based on the moving time length $t_2$ of moving the image to-be-fixed and inserting the heating time length $t_3$ of the second heating into the time axis, allowing the time length $t_3$ to end earlier than the moving time length $t_2$ by a set time; and determining a starting point of the heating time length $t_3$, according to a time length of the heating time length $t_3$ in the time axis, and using the starting point of the heating time length $t_3$ as the heating start time of the second heating.

Embodiments of the present disclosure also provide an apparatus of heating control applied in an image forming device. The apparatus of heating control includes a possessor and a memory. The memory stores at least one instruction. The at least one instruction is loaded and executed by the processor to implement the method of heating control in the image forming device.

Embodiments of the present disclosure also provide an image forming device, including the apparatus of heating control applied in the image forming device.

Embodiments of the present disclosure also provide a computer-readable storage medium, storing a computer program that implements the method of heating control in the image forming device when the computer program is executed by the processor.

The present disclosure determines the characteristic of temperature change of a heater being heated under the current environment of the power supply or the voltage parameter of the current power supply. The present disclosure also determines the heating start time of the second heating of a preheated heater according to the characteristic of the temperature change or voltage parameter of the current power supply. Finally, the heating of the heater is completed within a set time range by adjusting the heating start time of the second heating of the heater. For example, the temperature of the heater reaches a target temperature of fixing within a set time before an image to-be-fixed enters the fixing assembly. The heating start time of the second heating of the heater is real-time adjusted in each fixing operation according to the fluctuations of the actual voltage to avoid the issue of unfirm fixing or image ghosting caused by the voltage fluctuation mentioned in the Background.

BRIEF DESCRIPTION OF THE DRAWINGS

The following drawings are incorporated herein as a part of the present disclosure. The accompanying drawings illustrate certain embodiment(s) of the present disclosure, which explains the principles of the present disclosure.

DETAILED DESCRIPTION OF THE EMBODIMENTS

Figure 1:
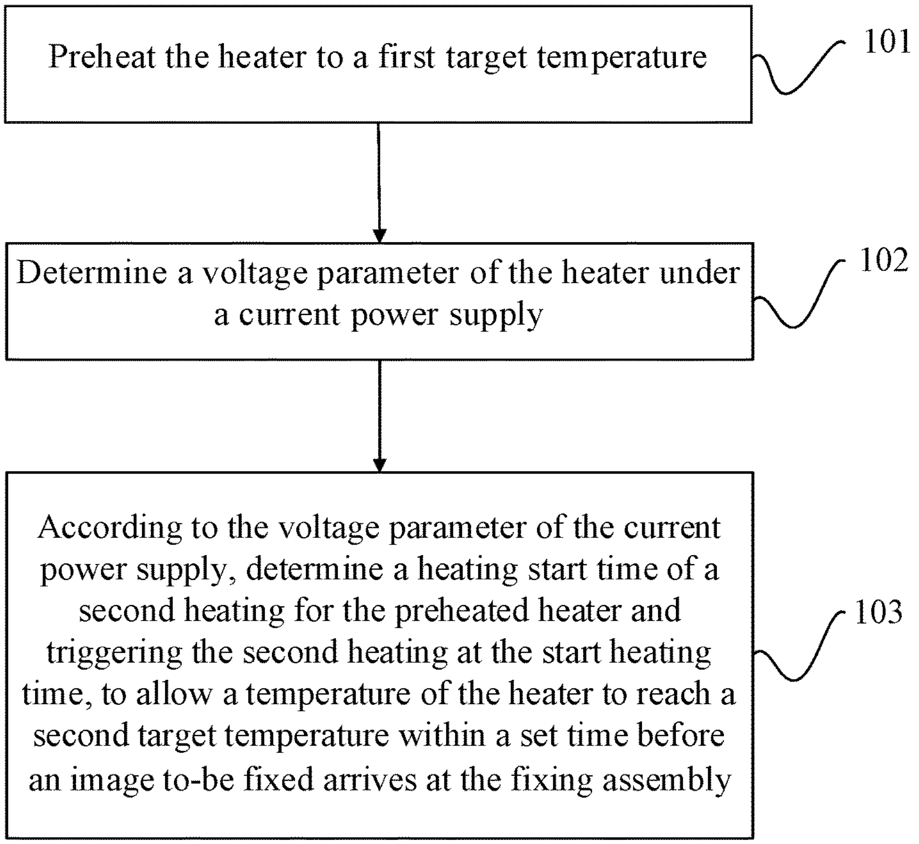
FIG. 1 depicts a schematic flowchart of a method of heating control for an image forming device according to embodiments of the present disclosure.

Technical solutions of the present disclosure will be described with reference to the accompanying drawings and specific embodiments. It will be appreciated that the described embodiments are some rather than all of the embodiments of the present disclosure. Other embodiments conceived by those having ordinary skills in the art on the basis of the described embodiments without inventive efforts should be encompassed within the scope of the present disclosure.

Description of Printing Process:

The following takes laser imaging image forming device as an example. An image forming device is configured to implement a task of forming an image, including for example, generating, printing, receiving, and sending image data. The following description takes printing as an example, for illustration purposes, it is also referred to as a printer in the following description. A printing process includes charging, exposure, development, transfer, and fixing. The specific operation instructions are as follows:

About the Charging Operation

A charging roller in a printer charges a drum surface.

About the Exposure Operation

After receiving a printing task sent by a terminal, an internal processor of the printer converts pixels to be printed into exposure information in advance and sends the exposure information to a laser scanning unit. The laser scanning unit receives the exposure information sent by the internal processor of the printer and exposes the drum according to the exposure information, which generates an electrostatic latent image on the charged drum surface.

About the Development Operation

The drum rotates to the position of a developing roller. Since the position where the laser scanning unit needs to generate an image is exposed, there will be a potential difference between the exposed position of the laser scanning unit and the developing roller, and the toner will be transferred to the exposure area. The developing roller develops on the drum surface to form a toner image.

About the Transfer Operation

If applying a method of second transfer, the drum first transfers an image of monochrome toner on its surface to a transfer belt, and then generates an image of color toner on the transfer belt. The image of color toner on the transfer belt is secondarily transferred to a piece of paper by a secondary transfer roller to generate an image to-be-fixed, that is, an image of toner to-be-fixed is generated on the paper, and the paper bearing the image of toner needs to go through the fixing assembly to fix the image on the paper.

Description of the Fixing Operation

The paper bearing the image to-be-fixed passes through the nip area formed by a heat roller and a pressure roller of the fixing assembly. A toner was heated and pressurized on the paper by which the toner is melted and fixed on the paper to finally generate the printed image. The required heat for heating the heat roller is provided by the heater after second heating in the heat roller. The heater is a ceramic sheet, a halogen lamp, or based on induction heating. In the following embodiments, the ceramic sheet is used as an example for description.

Description of process of verifying the direct relationship between an actual voltage of power supply and a heating time:

After the printer is started or after receiving a printing task, the ceramic sheet is preheated. Before the fixing operation is performed, the preheated ceramic sheet is heated for a second time to further perform the fixing operation. When the printer is working, it is powered by directly connecting the mains. If the printer does not have an internal voltage conversion while powering the ceramic sheet, the voltage range is 198-235 V. In the working environment of the printer (connected to a same power supply), the actual voltage of the power supply of the printer fluctuates when other electrical devices are connected or disconnected from the same power supply.

Firstly, it is assumed that the actual voltage of the power supply of an image forming device (such as a printer) is directly related to the heating time of the heater (such as a ceramic sheet) in the fixing assembly of the device. According to the following multiple experiments to calculate the actual voltage of the power supply as well as multiple calculation results to verify the assumption, because the image forming device cannot identify its own actual voltage of the power supply, the current voltage feature of the image forming device (such as the actual $U_1$ of the power supply) can be determined through the following calculation steps:

Step P1: Determining a reference preheating time $t_0$;

Step P2: Obtaining an actual preheating time $t_1$; and

Step P3: Calculating the actual voltage $U_1$ of power supply based on the reference preheating time $t_0$ and the actual preheating time $t_1$.

Please note, data of the heater being heated in any heating stage during the heating process under the current environment of the power supply can be analyzed. For example, a direct relationship between the actual voltage of the power supply of the printer and the heating time of the ceramic sheet is verified by data of preheating in Steps P1-P3.

Please note, analyzing the data of the heater being heated in any heating stage during the heating process under the current environment of the power supply includes analyzing direct or indirect heating data of the heater. For example, for the heating based on a ceramic sheet, temperature data collected by a temperature sensor connected to the ceramic sheet can be directly analyzed; For the heating based on a halogen lamp, temperature data is collected by a temperature sensor connected to the surface of the heating roller where the halogen lamp is located.

About the Step P1

Since the heating circuit of the heater (ceramic sheet) in the fixing assembly is a pure resistance circuit, same electrical energy is required to heat the heater from one temperature (such as the current temperature) to another temperature (such as the target temperature of preheating) at different voltages with a fixed power. After determining the required electric energy W to increase the temperature from the current temperature to the target temperature of preheating and the resistance R of the ceramic sheet, based on the formula of the electric energy, the reference preheating time $t_0$ of heating the ceramic sheet to the target temperature of preheating can be calculated under the condition that the actual voltage of the power supply of the printer stabilizes at a voltage. Among them, the required electric energy W can be can be tested in multiple experiments to obtain the required electrical energy W to increase the current temperature to the target temperature of preheating under various working conditions. The various working conditions include a working condition of the printer when the printer is initially started and a working condition of printer after multiple printing operations. A corresponding table is built based on the experimental data. The table stores the required electric energy W to heat the ceramic sheet to raise a set temperature under each working condition.

About the step P2

Under any current working conditions, for the heating stage of preheating the ceramic sheet, obtaining the actual preheating time $t_1$ of the ceramic sheet.

About the step P3

According to the conservation of energy, the required electric energy corresponding to different voltages satisfies formula (1):

$$\frac{U_0^2 t_0}{R}\cdot N_0\,\%\cdot K1=\frac{U_1^2 t_1}{R}N_1\,\%\cdot K2 \tag{1}$$

where, the left side of the formula (1) is a set heating condition (could be the preheating), $U_0$ is a set voltage, R is the resistance of a ceramic sheet, $N_0\%$ is the percentage of heating power under a set heating condition, to is the heating time length of a heater being heated under a set voltage environment. The right side of the formula (1) can be any actual heating conditions (could be the same preheating process as the left side of the formula (1), thus the start and end temperatures of the heating are the same), $U_1$ is the actual voltage of power supply, $t_1$ is the actual heating time length of preheating, $N_0\%$ and N1% are the percentages of heating power under set heating conditions, $K_1$ and $K_2$ represent heat loss coefficients which can be determined by multiple experiments.

In addition, the formula (1) and the formula (3) which will be discussed below are only to illustrate the heating time length ($t_1$) and the temperature difference ($\Delta T_1$) between the start temperature ($T_{N1}$) and end temperature ($T_{N2}$) of the temperature range which will affect the characteristic of temperature change of the heater and the correlations between those parameters. However, the specific calculation formula may be restricted based on the actual demand, for example, the resistance of the heater, R, will also change with the temperature during the heating process.

When K1=K2 and the change of R is ignored, formula (2) can be derived from the formula (1):

$$\frac{t_1}{t_0}=\frac{U_0^2 N_0\,\%}{U_1^2 N_1} \tag{2}$$

Further, in the case where the actual heating time length $t_1$ of preheating the heater and a heating time length $t_0$ of preheating under a set operating condition are determined, the actual voltage $U_1$ of power supply can be obtained according to the formula (2).

After several calculations and experiments, multiple sets of data of the actual voltages of the power supply and the actual time lengths of preheating can be obtained. According to the multiple sets of data, the actual voltage of the power supply and the actual time length of preheating satisfy the relationship described in the formula (2). This also validates the assumption that the voltage of actual power supply of an image forming device (such as a printer) is directly related to the heating time of the heater (such as a ceramic sheet) in the fixing assembly of the device.

The above is a process of validating the assumption through multiple experiments. On this basis, the present embodiment provides a method of heating control for an image forming device. Specifically, the method of heating control provides a method that can control the heating of a heater in a fixing assembly in an image forming device without changing the circuit in the image forming device.

FIG. 1 illustrates a schematic flowchart of a method of heating control for an image forming device. As shown in FIG. 1, the method of heating control includes:

Step 101: when the image forming device is powered on, is woken up from sleep, or receives a task to be processed, preheating the heater to the first target temperature (target temperature of preheating);

Step 102: determining the voltage parameter of the current power supply of the heater;

Step 103: according to the voltage parameter under the current power supply, determining the start time of second heating for the preheated heater and triggering the second heating at the start time, allowing the temperature of the heater reach the second target temperature within a set time before an image to-be-fixed arrives at the fixing assembly. For example, to determine the start time of the second heating of the heater that has been preheated recently, or after each startup, the S101-S103 are executed once.

Step 102 can be realized through the following process:

Step 1021: determining the heating time length $t_1$ corresponding to any temperature ranges of the heater under the current environment of power supply;

Step 1022: determining the temperature difference $\Delta T_1$ of the temperature range with $T_{N1}$ as the start temperature and $T_{N2}$ as the end temperature;

Step 1023: determining the voltage parameter of the current environment of the power supply based on the heating time length $t_1$ and the temperature difference $\Delta T_1$ of the temperature range.

Step 1021

Once a temperature range of the heater during the heating process under the current environment of the power supply is selected, the temperature range of preheating the heater can be selected for analysis. The heater can be ceramic sheet, halogen lamp, or based on induction heating. For example, after preheating the ceramic sheet in the fixing assembly of the printer, the time length $t_1$ of preheating is obtained.

Step 1022

When the preheating is any temperature range during the heating process of the heater under the current environment of the power supply, the start temperature, $T_{N1}$, and the end temperature, $T_{N2}$, of the temperature range are the temperature of the heater when the preheating starts and the first target temperature (the target temperature of preheating) of the preheating process, respectively. The difference, $\Delta T_1$, between the start and end temperatures ($T_{N1}$ and $T_{N2}$) of the preheating can be determined. After preheating the ceramic sheet in the fixing assembly of the printer, the time length $t_1$ of the preheating is obtained. After determining the temperature difference $\Delta T_1$ and the heating time length $t_1$ of preheating, a first energy consumption for heating the heater (ceramic sheet) from $T_{N1}$ to $T_{N2}$ can be determined by the temperature difference $\Delta T_1$. Specifically, the specific heat capacity of the heater (ceramic sheet), C, can be predetermined, and then the first energy consumption, Q, can be determined according to C and $\Delta T_1$. Considering that there is energy loss in the heating stage, in some embodiments, Q includes a normally required energy and a loss energy to heat the heater (ceramic sheet) from $T_{N1}$ to $T_{N2}$.

Step 1023

After determining the first energy consumption Q to heat the ceramic sheet to the target temperature of preheating, the voltage parameter in the current environment of the power supply (for example, the actual voltage $U_1$ of the power supply) can be calculated;

According to the conservation of energy, the actual voltage $U_1$ of the power supply can be calculated by the following formula:

$$Q = \frac{U_1^2 t_1}{R} N_1\,\% \cdot K \tag{3}$$

where, R represents the resistance of ceramic sheet (predicted), $U_1$ represents the actual voltage of power supply, $t_1$ represents the obtained heating time length of preheating, $N_1$% represents the percentage of heating power in the preheating (predicted), and K represents the heat loss coefficient (predicted).

Further, when the actual heating time length $t_1$ of preheating and the reference heating time length $t_0$ of preheating of the heater are determined, the actual voltage $U_1$ of power supply can be calculated according to the formula (2). The actual voltage $U_1$ of the power supply is used as a voltage parameter of the current power supply.

In some embodiments, Step 102 is also implemented by the following operation steps:

Step 1021: determining the heating time length $t_1$ corresponding to any temperature range during the heating process of the heater under the current environment of the power supply;

Step 1022: determining the heating time length $t_0$ corresponding to the temperature range during the heating process of the heater under a standard voltage $U_0$;

Step 1023: calculating the actual voltage $U_1$ of the power supply of the heater under the current environment of power supply according to the formula in below, where $U_1$ is also regarded as a voltage parameter of the current power supply:

$$\frac{t_1}{t_0} = \frac{U_0^2 N_0\,\%}{U_1^2 N_1}$$

Step 1021

After any temperature ranges during the heating process of the heater under the current environment of power supply is selected, preheating the heater in a temperature range can be accordingly selected and analyzed. The heater can be ceramic sheet, halogen lamp, or based on induction heating. For example, after preheating the ceramic sheet in the fixing assembly of the printer, the time length $t_1$ of preheating is obtained.

Step 1022

After preheating the ceramic sheet in the fixing assembly of the printer, the heating time length $t_1$ of preheating can be obtained. The heating power for preheating the ceramic sheet can also be determined (the preheating stage generally includes a heating with full power). Since the heating circuit in the fixing assembly is a pure resistance circuit, the electric energy required to heat the heater from one temperature (such as the current temperature) to another temperature (such as the target temperature of preheating) under different voltages is the same by a fixed power (e.g., full power, half power, or other set power). After determining the required electric energy W to heat the heater from the current temperature to the target temperature of the preheating and the resistance of the ceramic sheet R, the reference time length $t_0$ to heat the ceramic sheet to the target temperature can be calculated through the electric energy formula under the condition that the actual voltage of the power supply of the printer stabilizes at 220V. Among them, the required electric energy W can be obtained through multiple experiments under different working conditions (e.g., the printer in the working condition of just started and the printer in the working condition of after multiple printing operations). The electric energies W to heat the heater from current temperature to target temperatures of preheating are recorded and used to construct a table. The table stores the electric energies W which are used to heat the heater (e.g., ceramic sheet) to the target temperatures under the different working conditions.

Step 1023

After determining the reference heating time length $t_0$ of heating the ceramic sheet to the target temperature of preheating, the actual voltage of the power supply under the current environment of the power supply can be calculated according to the formula (1):

$$\frac{U_0^2 t_0}{R} \cdot N_0\% \cdot K1 = \frac{U_1^2 t_1}{R} N_1\% \cdot K2 \quad (1)$$

In this embodiment, $U_0$ represents a set voltage, e.g., the standard voltage of 220V, R represents the resistance of ceramic sheet, to represents a time length of preheating under a working condition which is predicted by calculation. $U_1$ represents the actual voltage of power supply, $t_1$ represents the actual heating time length of preheating, $N_0\%$ and $N_1\%$ represent the percentages of heating power in corresponding heating periods, which are known in advance. $K_1$ and $K_2$ are heat loss coefficients which can be determined by multiple experiments.

In addition, the formula (1) and the formula (3) which will be discussed below are only to illustrate the heating time length ($t_1$) and the temperature difference ($\Delta T_1$) between the start temperature ($T_{N1}$) and end temperature ($T_{N2}$) of the temperature range which will affect the characteristics of temperature change of the heater and the correlations between those parameters. However, the specific calculation formula may be restricted based on the actual demand, for example, the resistance of the heater, R, will also change with the temperature during the heating process.

When K1=K2 and the change of R is ignored, the formula (2) can be derived from the formula (1):

$$\frac{t_1}{t_0} = \frac{U_0^2 N_0\%}{U_1^2 N_1} \quad (2)$$

Further, when the actual time length $t_1$ of preheating the heater and the reference time length $t_0$ of preheating are determined, the actual voltage of power supply $U_1$ is obtained according to the formula (2). $U_1$ is used as a voltage parameter of the current power supply.

In this embodiment, Step 103 is further accomplished by the following steps:

Step 1031: determining the moving time length $t_2$ of moving an image to-be-fixed to the fixing assembly;

Step 1032: determining the temperature difference, $\Delta T_2$, between the second target temperature and the temperature of preheated heater;

Step 1033: determining the heating time length $t_3$ of heating the preheated heater to the second target temperature;

Step 1034: determining the start time of heating according to the correlation between the heating time length $t_3$ of second heating and the moving time length $t_2$ of moving the image to-be-fixed, and triggering the second heating at the start time to make the temperature of the heater reaches the second target temperature within a set time decided by the moving time length of moving the image to-be-fixed to the fixing assembly.

Step 1031

After preheating the heater, the heater waits for the image forming device to complete the image processing. For example, when an internal processor of the printer receives a printing job sent by the user terminal, it converts the pixels that need to be printed out in the printing job into exposure information. An exposure unit in the printer exposes the drum, forming static electricity on the surface of the drum. The drum rotates to the position of the developing roller. Since the position where the exposure unit needs to generate an image has been exposed, there will be a potential difference between the exposed position and the developing roller, by which the toner will be transferred to the exposure area to generate an image. With the rotation of the drum, the image is transferred to a transfer belt. The image of the transfer belt rotates to the position of a second transfer roller, and the image is transferred to a piece of paper. When the piece of paper was transported to a fixing assembly, the fixing assembly fuses and fastens the image onto the piece of paper.

In the above-mentioned fixing process, there also exists a moving time length of moving the image to-be-fixed to the nip area of fixing assembly, which is denoted as $t_2$. In the process of moving the paper to the nip area of fixing assembly, the moving time length of moving the foremost edge of a piece of paper in the moving direction to reach the nip area of fixing assembly is pre-existed. Since the top contour of the image to-be-fixed in each printing job has a different distance from the foremost edge of the paper, the actual time length $t_2$ of moving the image to-be-fixed to the nip area of fixing assembly is determined by the relative distance between the top contour of the image to-be-fixed and the foremost edge of the paper. However, the relative distance can be determined during processing the image by the printer, and the actual time length $t_2$ of moving the image to-be-fixed to the nip area of fixing assembly can be calculated and obtained.

Step 1302

After the heater in the fixing assembly completes the preheating, it needs to wait for the internal processor of the printer to complete the processing of the corresponding image. Because the processing efficiency of the internal processor of different printers is different and different printing tasks have different sizes, the waiting time of the preheated heater is affected by those factors. Therefore, after the heater completes preheating, it is necessary to real-time determine the temperature of the heater as well as the temperature difference, $\Delta T_2$, between the second target temperature (target temperature of fusing) and the current temperature after the heater completes preheating.

Step 1033

In the case of confirming the temperature difference $\Delta T_2$ between a target temperature of fixing and a current temperature of the preheated heater, and the actual voltage $U_1$ of power supply of an image forming device, a second energy consumption of second heating of the heater (ceramic sheet) can be determined via a temperature difference $\Delta T_1$. The second heating means heating the preheated heater from the current temperature to the second target temperature. Specifically, the specific heat capacity of the heater (ceramic sheet), C, can be predetermined, and then the first energy consumption, Q, can be determined according to the specific heat capacity of the heater (ceramic sheet) C and the temperature difference $\Delta T_1$. Considering that there is energy loss in the heating stage, in some embodiments, the first energy consumption Q includes a normally required energy and a loss energy to heat the heater (ceramic sheet) from $T_{N1}$ to $T_{N2}$. Further, the heating time length of a second heating, $t_3$, can be obtained by the formula (3):

$$Q = \frac{U_1^2 t_1}{R} N_1 \% \cdot K \tag{3}$$

Step 1034

The start time of heating is determined according to the correlation between the heating time length of the second heating, $t_3$, and the moving time length of moving the image to-be-fixed, $t_2$. The second heating is triggered at the start time of heating to make the temperature of the heater reaches the second target temperature within the set time, or before the image to-be-fixed is moved to the fixing assembly.

The start time of heating the heater is determined according to the correlation between the heating time length, $t_3$, determined in Step 1033 and the actual time length $t_2$ of moving the image to-be-fixed, determined in Step 1031. Specifically, the time axis can be established based on the heating time length $t_2$ of moving the image to-be-fixed. By inserting the heating time length of second heating, $t_3$, into the time axis, the heating time length $t_3$ ends earlier than the moving time length $t_2$ by a set time (for example, 0.5 s earlier). According to the time length of heating time length $t_3$ in the time axis, the starting point of the heating time length $t_3$ is determined and taken as the start time of heating for the heater.

The heater is heated at the determined start time, so that the heater can reach the target temperature of fixing within a set time before the image to-be-fixed is moved to the nip are of fixing assembly.

In this embodiment, Step 103 can be further implemented by the following steps:

- Step 1031: determining the moving time length $t_2$ of moving the image to-be-fixed to the fixing assembly;
- Step 1032: determining the temperature difference $\Delta T_2$ between the second target temperature and the temperature after the heater is being preheated;
- Step 1033: according to the actual voltage of power supply, $U_1$, a pre-stored table or pre-stored simulation curve is matched with the actual voltage $U_1$. The temperature difference, $\Delta T_2$, is input into the pre-stored table or the start and end temperatures of the second heating are projected to the pre-stored simulation curve. The time length of second heating, $t_3$, can be further determined.
- Step 1034: determining the start time of heating according to the correlation between the heating time length $t_3$ of second heating and the moving time length $t_2$ of moving the image to-be-fixed, and triggering the second heating at the start time. The temperature of the heater reaches the second target temperature within a set time before the image to-be-fixed is moved to the fixing assembly.

Step 1031

After preheating the heater, the heater waits for the image forming device to complete the image processing. For example, when the internal processor of the printer receives a printing job sent by the user terminal, it converts the pixels that need to be printed out in the printing job into exposure information. An exposure unit in the printer exposes the drum, forming static electricity on the surface of the drum. The drum rotates to the position of the developing roller. Since the position where the exposure unit needs to generate an image has been exposed, there will be a potential difference between the exposed position and the developing roller, by which the toner will be transferred to the exposure area to generate an image. With the rotation of the drum, the image is transferred to a transfer belt. The image of the transfer belt rotates to the position of a second transfer roller, and the image is transferred to a piece of paper. When the piece of paper is transported to a fixing assembly, the fixing assembly fixes and fastens the image onto the piece of paper.

In the above-mentioned fixing process, there also exists a moving time length of moving the image to-be-fixed to the nip area of fixing assembly, which is denoted as $t_2$. In the process of moving the paper to the nip area of fixing assembly, the time length of moving the foremost edge of a piece of paper in the moving direction to reach the nip area of fixing assembly is pre-existed. Since the top contour of the image to-be-fixed in each printing job has a different distance from the foremost edge of the paper, the actual time length $t_2$ of moving the image to-be-fixed to the nip area of fixing assembly is determined by the relative distance between the top contour of the image to-be-fixed and the foremost edge of the paper. However, the relative distance can be determined during the processing of the image by the printer, and the actual time length $t_2$ of moving the image to-be-fixed to the nip area of fixing assembly can be calculated and obtained.

Step 1302

After the heater in the fixing assembly completes the preheating, it needs to wait for the internal processor of the printer to complete the processing of the corresponding image. Because the processing efficiency of the internal processor of different printers is different, and different printing tasks have different sizes, the waiting time of the preheated heater is affected by those factors mentioned above. Therefore, after the heater completes preheating, it is necessary to real-time determine the temperature of the heater as well as the temperature difference, $\Delta T_2$, between the second target temperature (target temperature of the fixing) and the current temperature of the preheated heater.

Step 1033

In the case of confirming the temperature difference $\Delta T_2$ between a target temperature of fixing and a current temperature of the preheated heater, the corresponding pre-stored table or pre-stored simulation curve is obtained by pairing the actual voltage of power supply, $U_1$, and a set heating power of the second heating with the database. In this embodiment, the pre-stored tables are used to store each temperature range and the corresponding heating time length of the heater under different environments of the power supply. The pre-stored simulation curves are the temperature change curves of the heater under different environments of power supply.

In the case of matching the pre-stored table with the current second heating condition, the determined data (temperature difference, $\Delta T_2$) is input into the pre-stored LUT table, and determine the corresponding time length $t_3$ of the second heating.

In the case of matching the pre-stored simulation curve with the current second heating condition, the determined data (the start and end temperatures of the second heating) is projected to the pre-stored simulation curve. By further projecting, the heating time length $t_3$ corresponding to the start and end temperatures of the second heating can be obtained.

Step 1034

According to the correlation between the heating time length $t_3$ of the second heating and the moving time length $t_2$ of moving the image to-be-fixed, a heating start time is determined. The heating was triggered at the heating start time. By this means, the temperature of the heater reaches the second target temperature within a set time prior to the delivery of the image to-be-fixed at the fixing assembly.

The heating start time of the heater is determined according to the correlation between the heating time length, $t_3$, determined in Step 1033 and the actual moving time length of moving the image to-be-fixed, $t_2$, determined in Step 1031. Specifically, the time axis can be established based on the $t_2$. By inserting the time length of second heating, $t_3$, into the time axis, the heating time length $t_3$ ends earlier than moving time length $t_2$ by a set time (for example, 0.5 s earlier). According to the heating time length $t_3$ in the time axis, the starting point of heating time length $t_3$ is determined and taken as the start time of heating for the heater.

The heater is heated at the determined start time, so that the heater can reach the target temperature of fixing within the set time prior to the image to-be-fixed is moved to the nip area of fixing assembly.

Figure 2:
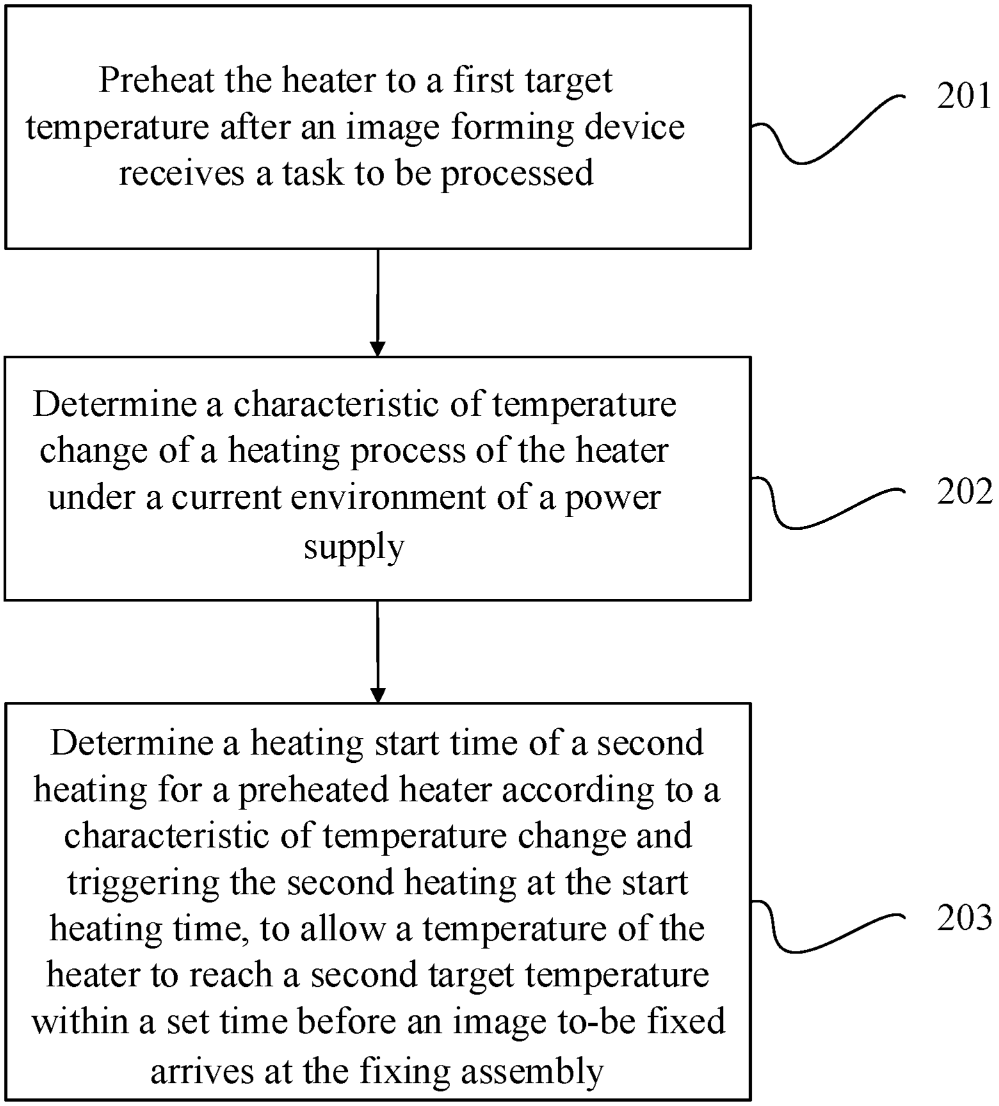
FIG. 2 depicts a schematic flowchart of another method of heating control for an image forming device according to embodiments of the present disclosure.

FIG. 2 is a schematic flowchart of another method of heating control applied in an image forming device of the present invention. The method of heating control is a method provided in an ideal environment without considering a percentage of heating power and an energy loss. Specifically, the method of heating control includes a first heating process. As shown in FIG. 2, the first heating process includes:

Step 201: preheating a heater in a fixing assembly of an image forming device so that the heater is heated to the first target temperature (target temperature of preheating);

Step 202: determining the characteristic of temperature change of the heater during heating under the current environment of the power supply.

Step 203: according to the characteristic of temperature change, determining the start time of second heating of the preheated heater. The second heating is triggered at the start time to make the temperature of the heater reach the second target temperature within a set time prior to the image to-be-fixed arrives at the fixing assembly.

Step 202 can be achieved by the following steps:

Step 2021: determining a heating time length $t_1$ of a heater corresponding to any temperature ranges under the current environment of the power supply;

Step 2022: according to the temperature difference $\Delta T_1$ between the start and end temperature of the temperature range and the heating time length $t_1$, determining a heating rate, $t_1/\Delta T_1$, of the heater under current environment of the power supply and taking the heating rate as a characteristic of the temperature change.

Step 2021

After any temperature ranges during the heating process of the heater under the current environment of the power supply is selected, preheating the heater in a temperature range can be accordingly selected and analyzed. When preheating the heater in the fixing assembly of the image forming device, the actual time length $t_1$ of preheating the heater to the target temperature of the preheating is obtained. The heater can be a ceramic sheet, halogen lamp, or based on induction heating. The preheating is a fixed power heating and its target temperature is predetermined.

Since the temperature of the heater prior to preheating is related to the ambient temperature, the temperature of the heater prior to preheating is a variable. Moreover, the actual voltage of the power supply for the device of image generation is also a variable. For example, when the printer is in an operating environment, another electrical appliance starts after being powered on. The actual voltage of the power supply of the printer fluctuates, and the fluctuations of voltage also affect the actual time length $t_1$ of preheating the heater to the target temperature of preheating.

According to the above discussion, there are two variables in the process of determining the actual time length $t_1$ of preheating the heater. The two variables are: the temperature of the heater prior to preheating and the actual voltage of the power supply of the printer. For the accuracy of heating control in each fixing operation, it is necessary to determine the actual time length $t_1$ of preheating the heater for every preheating.

Step 2022

After determining the actual time length of preheating, $t_1$, the temperature difference of a selected temperature range, $\Delta T_1$ is also to be determined. When the preheating is the selected temperature range, $\Delta T_1$ is the difference between the target temperature of preheating and the temperature of the heater prior to preheating. According to the actual heating time length $t_1$ and the temperature difference $\Delta T_1$, a heating rate of heating the heater is determined. Specifically, the heating rate is determined by $t_1/\Delta T_1$ which is also regarded as a characteristic of the temperature change.

Step 203 can be achieved by following steps:

Step 2031: determining the moving time length $t_2$ of moving the image to-be-fixed to the fixing assembly;

Step 2032: determining a temperature difference $\Delta T_2$ between a second target temperature and a temperature after preheating the heater;

Step 2033: determining the time length of the second heating, $t_3$, according to the heating rate, $t_1/\Delta T_1$, and the temperature difference, $\Delta T_2$;

Step 2034: determining the start time of heating according to the correlation between the heating time length $t_3$ of second heating and the moving time length $t_2$ of moving the image to-be-fixed.

Step 2031

After preheating the heater, the heater waits for the image forming device to complete the image processing. For example, when the internal processor of the printer receives a printing job sent by the user terminal, it converts the pixels that need to be printed out in the printing job into exposure information. An exposure unit in the printer exposes the drum, forming static electricity on the surface of the drum. The drum rotates to the position of the developing roller. Since the position where the exposure unit needs to generate an image has been exposed, there will be a potential difference between the exposed position and the developing roller, by which the toner will be transferred to the exposure area to generate an image. With the rotation of the drum, the image is transferred to a transfer belt. The image of the transfer belt rotates to the position of a second transfer roller, and the image is transferred to a piece of paper. When the piece of paper is transported to a fixing assembly, the fixing assembly fuses and fastens the image onto the piece of paper.

In the above-mentioned fusing process, there also exists a moving time length of moving the image to-be-fixed to the nip area of fixing assembly, which is denoted as $t_2$. In the process of moving the paper to the nip area of fixing assembly, the time length of foremost edge of a piece of paper in the moving direction to reach the nip area of fixing assembly is pre-existed. Since the top contour of the image to-be-fixed in each printing job has a different distance from the foremost edge of the paper, the actual time length $t_2$ of moving the image to-be-fixed to the nip area of fixing assembly, is determined by the relative distance between the top contour of the image to-be-fixed and the foremost edge of the paper. However, the relative distance can be determined during processing the image by the printer, and the actual time length $t_2$ of moving the image to-be-fixed to the nip area of fixing assembly can be calculated and obtained.

Step 2032

After the heater in the fixing assembly completes the preheating, it needs to wait for the internal processor of the printer to complete the processing of the corresponding image. Because the processing efficiency of the internal processor of different printers is different, and different printing tasks have different sizes, the waiting time of the preheated heater is affected by those factors mentioned above. Therefore, after the heater completes preheating, it is necessary to real-time determine the temperature of the heater as well as the temperature difference, $\Delta T_2$, between the second target temperature (target temperature of fixing) and the current temperature after the heater completes preheating.

Step 2033

According to the heating rate obtained in the step 202 and the temperature difference, $\Delta T_2$, determined in the step 2032, the required heating time length $t_3$ of heating the heater to the target temperature of fixing (second heating) can be determined. Heating the heater to the target temperature of fixing is second heating in the present disclosure. Specifically, the required heating time length $t_3$ can be calculated by:

$$t_3 = \frac{t_1}{\Delta T_1} \times \Delta T_2$$

where the temperature difference, $\Delta T_2$, is real-time updated according to the current temperature of the heater. Therefore, the required heating time length $t_3$ is also real-time updated according to the temperature difference $\Delta T_2$.

Step 2034

The start time of heating the heater is determined according to the correlation between the heating time length, $t_3$, determined in the step 2033 and the actual moving time length $t_2$ of moving the image to-be-fixed. Specifically, the time axis can be established based on the moving time length $t_2$ of moving the image to-be-fixed. By inserting the time length of second heating, $t_3$, into the time axis, the heating time length $t_3$ ends earlier than moving time length $t_2$ by a set time (for example, 0.5 s earlier). According to the time length of the heating time length $t_3$ in the time axis, determining the starting point of the heating time length $t_3$, and the starting point of the heating time length $t_3$ is taken as the start time of heating the heater.

The heater is heated at the determined start time, so that the heater can reach the target temperature of fixing within the set time prior to the image to-be-fixed arrives the nip area of fixing assembly.

Some embodiments further include a second heating process. After the image forming device receives a task to be processed, it first determines whether the first heating process or the second heating process will be adopted. The determination that is made after receiving the image forming task (such as receive a printing job) performs the following operations:

Step 01: determining whether the current temperature of the heater is higher than the target temperature of the preheating;

if not, proceed to Step 10: implementing the first heating process;

if yes, proceed to Step 20: implementing the second heating process.

Step 01

When the printer performs continuous printing jobs, that is, when the printer continues to receive new printing jobs, an interval between two adjacent printing jobs determines the current temperature of the heater. The impact of the interval between two adjacent printing jobs will occur in the following two situations:

the temperature of the heater drops to below the target temperature of preheating; or the temperature of the heater drops but still above the target temperature of preheating.

When the current temperature of the heater is higher than the target temperature of preheating, preheating will not be implemented in the heater. Then, the actual time length of preheating under the current power supply voltage cannot be obtained. Therefore, the heating rate of the heater cannot be further determined when the heater is heated at the current supply voltage. In this case, a second heating process is implemented to solve the above issue.

The second heating process includes the following steps:

Step 301: obtaining the moving time length $t_2$ of moving an image to-be-fixed in this fixing process and the heating rate of the last first heating process;

Step 302: determining the heating start time according to the moving time length $t_2$ of moving the image to-be-fixed and the heating rate that are obtained from the step 301; and Step 303: triggering the second heating of the heater at the determined heating start time from the step 302.

Since preheating only applies to the first heating process of the heater, the heating rate in the last first heating process can be directly obtained, which can help determine the required heating time length $t_3$ to heat the heater to the target temperature of fixing under the current heating process. The moving time length of moving the image to-be-fixed in current fixing is further determined. In the case where the heating time length $t_3$ and the moving time length of moving the image to-be-fixed in current fixing $t_2$ are determined simultaneously, the start time of heating the heater corresponding to the current heating process can be determined based on the same method used in the first heating process. Meanwhile, the second heating of the heater is triggered at the determined start time of heating to make the temperature of the heater reaches the target temperature of fixing within the set time prior to the arrival of the image to-be-fixed at the nip area of fixing assembly.

Step 302

Since it is determined that the temperature of the heater is higher than the target temperature of preheating before the second heating process is implemented, a current temperature of the heater can be regarded as the temperature after preheating. The temperature difference $\Delta T_2$ between the target temperature of fusing and the current temperature of heater (ceramic sheet) is determined in real time.

The time length of second heating, $t_3$, can be determined based on the temperature difference, $\Delta T_2$, and the obtained heating rate of the last first heating process based:

$$t_3 = \frac{t_1}{\Delta T_1} \times \Delta T_2$$

The time axis can be established based on the time length of moving the image to-be-fixed, $t_2$. By inserting the time length of second heating, $t_3$, into the time axis, the heating time length $t_3$ ends earlier than moving time length $t_2$ by a set time (for example, 0.5 s earlier). According to the time length of the heating time length $t_3$ in the time axis, determining the starting point of the heating time length $t_3$, and the starting point of the heating time length $t_3$ is taken as the start time of heating the heater. Meanwhile, the heating of the heater is triggered at the determined start time of heating to make the temperature of the heater reaches the target temperature of fixing within the set time prior to the arrival of the image to-be-fixed at the nip area of fixing assembly.

Half second after the heater is heated to the target temperature of fixing, the piece of paper having the image to-be-fixed moves to the nip area formed by the heat roller and the pressure roller in the fixing assembly. When the piece of paper passes through the nip area, the ceramic sheet in the fixing film of which the temperature reaches the target temperature of fixing can heat the toner on the paper. The pressure roller presses the piece of paper to make the heated and melted toner fused on the piece of paper, generating a printed image.

Based on the above embodiment, under different voltages of power supply, the start time of heating is adjusted accordingly to ensure that the ceramic sheet can reach the target temperature of fixing while the ceramic sheet has not stayed at that temperature for a long time before the image to-be-fixed on the paper arrives at the nip area of fixing assembly. By this means, the start time of heating can be reasonably and stably controlled to address the issue in image fixing caused by the voltage fluctuations.

Moreover, compared with adding a voltage stabilizer circuit, the technical solution disclosed in the present disclosure predicts the actual voltage of the power supply according to the heating time length and adjusts the start time of fixing according to the predicted value without modifying the circuits. The technical solution disclosed in the present disclosure addresses the issues of unfirm fixing or image ghosting at a low cost.

Figure 3:
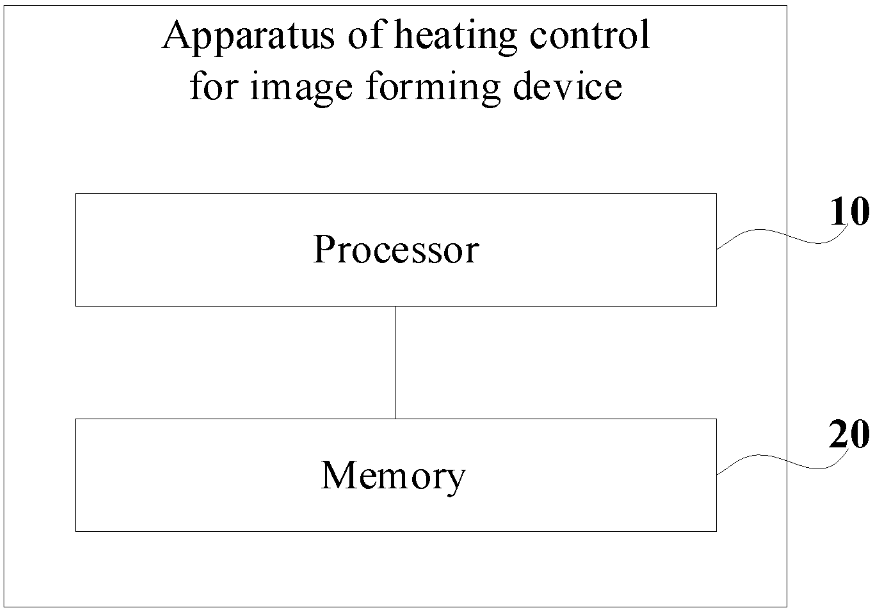
FIG. 3 depicts a schematic structural diagram of an apparatus of heating control applied in an image forming device according to embodiments of the present disclosure.

In some embodiments, there further provides an apparatus of heating control for an image forming device. FIG. 3 shows a schematic structural diagram of an apparatus of heating control in an image forming device of some embodiments. As shown in FIG. 3, the apparatus of heating control includes:

a processor 10 and a memory 20. The memory is for storing at least one instruction that, when loaded and executed by the processor 10, implements the following control method of heating for an apparatus of image forming:

when the image forming device is powered on, is woken up from sleep, or receives a task to be processed, preheating the heater to the first target temperature;

determining the characteristic of temperature change of the heater under the current environment of the power supply or the voltage parameter of the current power supply;

according to the characteristic of temperature change or the voltage parameter of the current power supply, determining the start time of the second heating of the preheated heater, and triggering the second heating at the start time. By this means, the temperature of the heater reaches the second target temperature within a set time before the image to-be-fixed is moved to the fixing assembly.

Further, determining the voltage parameter of the current environment of power supply of the heater includes:

determining the heating time length $t_1$ corresponding to any temperature ranges of the heater under the current environment of the power supply, the temperature difference $\Delta T_1$ between the start temperature $T_{N1}$ and end temperature $T_{N2}$ of the temperature range, and the first energy consumption to heat the heater from $T_{N1}$ to $T_{N2}$.

A voltage parameter $U_1$ of the current environment of power supply is obtained by calculating according to the heating time length $t_1$, the temperature difference $\Delta T_1$ of the temperature range, and the first energy consumption.

Further, the determining the start time of second heating of the preheated heater according to a voltage parameter includes:

- determining the time length $t_2$ of moving the image to-be-fixed to the fixing assembly;
- determining the heating time length $t_3$ of heating the preheated heater from current temperature to the second target temperature;
- determining the start time according to the correlation between the heating time length $t_3$ of the second heating and the moving time length $t_2$ of moving the image to-be-fixed.

Further, determining the heating time length of heating the preheated heater from the current temperature to the second target temperature, includes:

- determining the temperature difference $\Delta T_2$ between the second target temperature and the current temperature after the heater is preheated; determining the second energy consumption of heating the preheated heater to the second target temperature based on $\Delta T_2$;
- determining the heating time length, $t_3$, according to the second energy consumption and the voltage parameter $U_1$ under the current environment of the power supply.

Further, determining the characteristic of temperature change of the heater under the current environment of the power supply includes:

determining the voltage parameter, $U_1$, under the current environment of the power supply;

matching the voltage parameter, $U_1$, with a pre-stored table or pre-stored simulation curve in the database and using the paired pre-stored table or pre-stored simulation curve as the characteristic of temperature change. In some embodiments, pre-stored table stores each temperature range of heating and the corresponding time length of the heating under different environments of the power supply. The pre-stored simulation curve is the temperature change curve of the heater being heated under different environments of the power supply.

Further, determining the start time of second heating of the preheated heater according to the characteristic of temperature change includes:

determining the moving time length $t_2$ of moving the image to-be-fixed to the fixing assembly;

determining the heating time length $t_3$ of heating the preheated heater to the second target temperature by looking up the corresponding value of the voltage parameter, $U_1$, in the paired pre-stored table or the pre-stored simulation curve;

determining the start time according to the correlation between the heating time length $t_3$ of the second heating and the moving time length $t_2$ of moving the image to-be-fixed.

Further, determining the start time according to the correlation between the $t_3$ and the $t_2$, includes:

establishing the time axis based on the moving time length $t_2$ of moving the image to-be-fixed. By inserting the heating time length $t_3$ of the second heating into the time axis, the heating time length $t_3$ ends earlier than the moving time length $t_2$ by a set time. According to the time length of the heating time length $t_3$ in the time axis, determining the starting point of the heating time length $t_3$, and the starting point of the heating time length $t_3$ is taken as the start time of heating for the heater.

Figure 4:
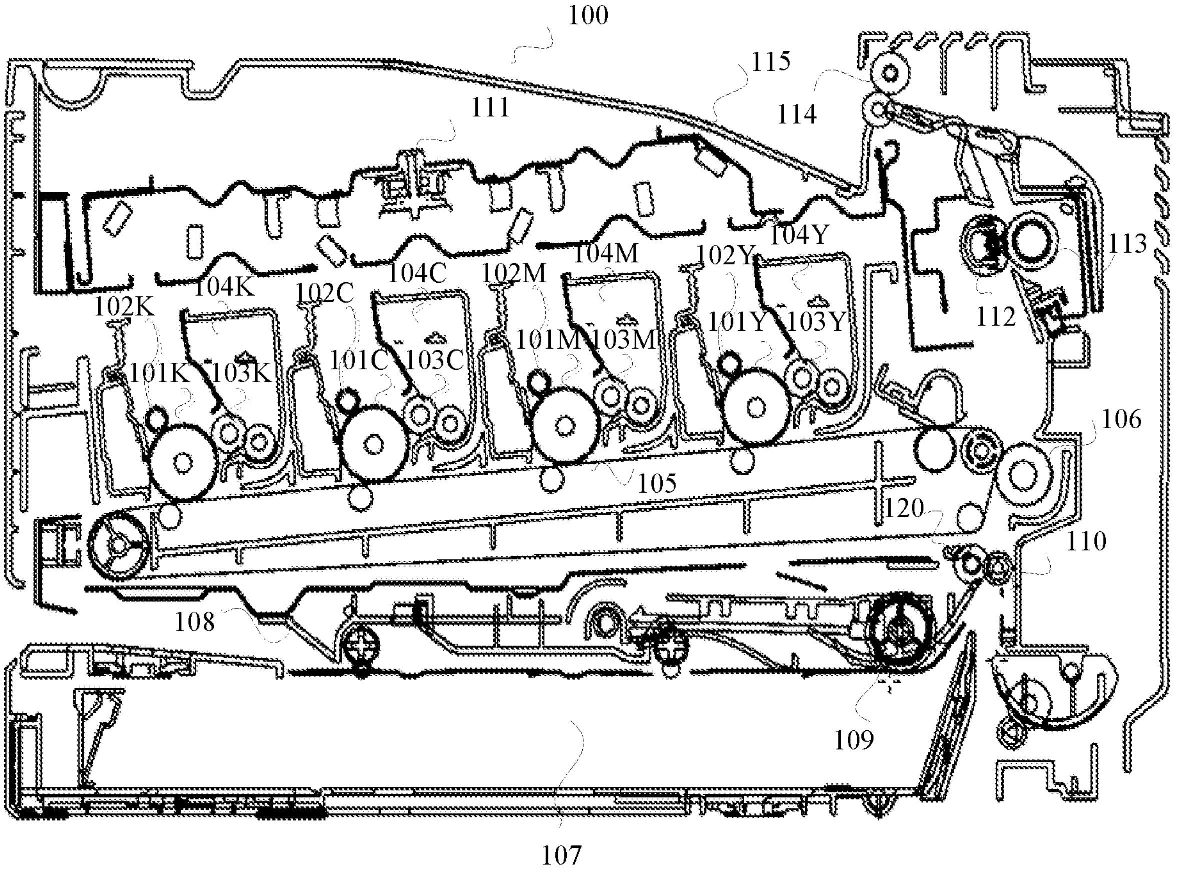
FIG. 4 depicts a schematic structural diagram of an image forming device according to embodiments of the present disclosure.

FIG. 4 is a schematic structural diagram of an image forming device provided in some embodiments of the present disclosure.

As shown in FIG. 4, the image forming device 100 is used to perform image forming tasks such as creating, printing, receiving, and transmitting image data. Examples of the image forming device 100 include a printer, a scanner, a copier, a facsimile machine, and a Multi-Functional Peripheral (MFP) that performs the above functions in a single device.

The method of heating control for the image forming device will be described in detail next with reference to a detailed operation flow of an internal device of the printer 100.

As shown in FIG. 4, the image forming device 100 includes a drum 101Y-K, a charging roller 102Y-K, a developing roller 103Y-K, a toner container 104Y-K, a transfer belt 105, a second transfer roller 106, a paper cassette 107, a manual feed tray 108, a pickup roller 109, a transport roller 110, a paper detection sensor 120, laser scanning unit (LSU) 111, a hot roller 112, a pressure roller 113, a discharge roller 114, and a discharge tray 115, etc. Generally, a processing cartridges C-M includes a drum 101Y-K, a charging roller 102Y-K, a developing roller 103Y-K, and s toner bin 104Y-K The LSU 111 is in the form of a single LSU including four beam paths. The four charging rollers 102Y-K are used to charge the surfaces of the four drums 101Y-K respectively. The four beam paths of the LSU 111 respectively emit laser beams to form electrostatic latent images on the surfaces of the four drums 101Y-K. The four developing rollers 103Y-K develops a colored toner image on the surfaces of the drums 101Y-K respectively. The image forming device 100 adopts a secondary transfer method, that is, the four drums 101Y-K sequentially transfer the toner images to the transfer belt 105. The colored toner image formed on the transfer belt 105 is then transferred to a piece of paper by a second transfer roller 106. The paper cassette 107 stores paper. The pickup roller 109 conveys the stored paper to a conveyance path (i.e., a paper path hereinafter). The conveying roller 110 conveys the paper to the second transfer roller 106.

The second transfer roller 106 transports the imaged paper to the nip between the hot roller 112 and the pressure roller 113. The hot roller 112 and the pressure roller 113 are used to fix the toner image on the paper. The hot roller 112 can adopt the method of ceramic heating. The hot roller 112 and the pressure roller 113 convey the fixed paper to the discharge roller 114. The discharge roller 114 discharges the paper to the discharge cassette 115 and stacks them.

Figure 5:
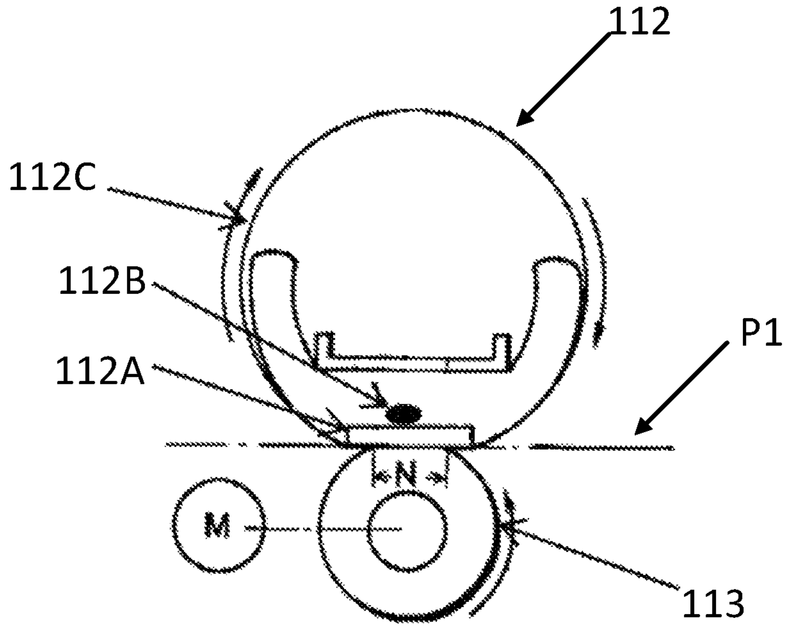
FIG. 5 depicts a schematic structural diagram of a nip area of a fixing assembly according to embodiments of the present disclosure.

FIG. 5 presents a schematic structural diagram of the nip area of fixing assembly in some embodiments. The second transfer roller 106 transports the imaged paper P1 to the fixing assembly as shown in FIG. 5, that is, the paper P1 moves to the nip area of fixing assembly between the hot roller 112 and the pressure roller 113. The hot roller 112 and the pressure roller 113 fix the toner image on the paper P1. The hot roller 112 heats the toner image on the paper P1 via the ceramic sheet 112A at the target temperature of fusing in the fixing film 112C. The hot roller 112 and the pressure roller 113 convey the fixed paper to the discharge roller 114, which discharges the paper to the discharge cassette 115 and stacks it.

The LSU 111 acquires the signal of optical analog image of the original/source document through the exposure of the optical print head. The paper detection sensor 120 detects whether there is paper in the paper path.

The paper cassette 107 includes a paper outlet. The pickup roller 109 is specifically used to send the paper stored in the paper cassette 107 from the paper outlet into the paper path for transfer requirements. The image forming device 100 also includes a driving unit (not displayed) for driving the pickup roller 109 to work. The driving unit includes a driving motor, which drives the pickup roller 109 to function and fulfill the pickup operation. The driving unit 181 is electrically connected with the controller of the image forming device (not displayed) to realize the working control of the driving unit by the controller. The controller is electrically connected to the paper detection sensor 120. The paper detection sensor sends the detection result of whether there is paper on the paper path back to the controller.

The image forming device 100 further includes an operation panel (not displayed) including an operation unit (not displayed) composed of various keys and a touch panel-type display unit (not displayed).

In some embodiments, when the printer receives the printing task sent by the user terminal, the following operations are triggered:

The internal processor (such as SOC, System-on-a-Chip) of the image forming device 100 performs corresponding image processing on the received image waiting to be processed;

The device of heating control determines whether the current temperature of the ceramic sheet 112A is higher than the preheating target temperature. Based on the comparison result, the device of heating control determines whether implementing the heating process.

Image processing on the received image waiting to be processed by the internal processor of the printer.

In a specific implementation, the LSU 111 obtains the signal of optical analog image of the original image through the exposure of the optical print head. The four drums 101Y-K generate images according to the optical analog image signal of the LSU 111. The four drums 101Y-K sequentially transfer the toner images to the transfer belt 105. Then the colored toner images formed on the transfer belt 105 are transferred to the paper by the second transfer roller 106, by which the generation of the image to-be-fixed is completed. In the above image processing operation, the time length $t_2$ of moving the image to-be-fixed to the nip can be determined according to the image information.

Determination of the Heating Process

Without considering the heating power percentage and energy loss, the method to further determine whether to implement the first heating process or the second heating process includes the following operations:

Step 01: determining whether the current temperature of the heater is higher than the target temperature of preheating;

Implementing the first heating process, if no;

Implementing the second heating process, if yes.

When implementing the first heating process, the following operations will be performed:

Before the preheating is started, the temperature of the ceramic sheet 112A before preheating is acquired by the temperature sensor 112B in the fixing assembly. The preheating process is triggered for the ceramic sheet 112A.

After triggering the preheating process for the ceramic sheet 112A, the control unit of heating for the image forming device controls the corresponding power supply of the fixing assembly to power the pure resistance circuit in the fixing assembly, which heats the ceramic sheet 112A in the fixing assembly. By this means, the temperature of the ceramic sheet 112A reaches the target temperature of preheating.

After the preheating is started, the actual time length $t_1$ of preheating the ceramic sheet 112A to the target temperature of preheating is obtained through the internal timing unit of the printer.

The control device of heating obtains the actual preheating time, $t_1$, and calculates the temperature difference between the target temperature of preheating and the temperature before preheating the ceramic sheet 112A, or the first temperature difference, $\Delta T_1$. According to the actual preheating time, $t_1$, and the first temperature difference, $\Delta T_1$, the heating rate during the heating process of the heater can be determined. Specifically, the heating rate is $t_1/\Delta T_1$.

When the second transfer is completed, that is, when the transfer of the image to-be-fixed onto the piece of paper, P1, is completed, the fixing operation is triggered. In this embodiment, the ceramic sheet needs to be heated to the target temperature of fixing within a set time before the piece of paper, P1, moving the image to-be-fixed to the nip area of fixing assembly. To achieve this purpose, it is necessary to adjust the start time of heating the ceramic sheet according to the moving time length $t_2$ of moving the image to-be-fixed. The specific operations are shown as follows:

determining in real time the temperature difference between the target temperature of fixing and the temperature of the ceramic sheet after preheating, or, the second temperature difference $\Delta T_2$;

The time length of second heating, $t_3$, is determined according to the second temperature difference $\Delta T_2$ and the heating rate according to:

$$t_3 = \frac{t_1}{\Delta T_1} \times \Delta T_2$$

The time axis can be established based on the moving time length $t_2$ of moving the image to-be-fixed. By inserting the heating time length $t_3$ of second heating into the time axis, the heating time length $t_3$ ends earlier than the moving time length $t_2$ by 0.5 s. According to the time length of the heating time length $t_3$ in the time axis, determining the starting point of the heating time length $t_3$, and the starting point of the heating time length $t_3$ is taken as the start time of heating the heater. Meanwhile, the heating of the heater is triggered at the determined start time of heating to make the temperature of the heater reaches the target temperature of fixing within the set time prior to the arrival of the image to-be-fixed at the nip.

According to the disclosed steps in above, 0.5 second after the heater is heated to the target temperature of fixing, the piece of paper having the image to-be-fixed, P1, moves to the nip area formed by the heat roller 112 and the pressure roller 113 in the fixing assembly, as shown in FIG. 5. When the piece of paper, P1, passes through the nip area, the ceramic sheet 112A in the fixing film 112C of which the temperature reaches the target temperature of fixing can heat the toner on the paper P1. The pressure roller presses the piece of paper P1 to make the heated and melted toner fused on the piece of paper, generating a printed image.

When implementing the second heating process, the following operations will be performed:

Skipping preheating the heater;

Obtaining the current temperature of the ceramic sheet in real time through the temperature sensor 112B;

Obtaining the time length $t_2$ of moving the image to-be-fixed related to this heating process and the heating rate in the last first fusing process;

Determining the temperature difference between the target temperature of fixing and the current temperature of the ceramic sheet in real time, or, the second temperature difference $\Delta T_2$;

The time length of second heating, $t_3$, is determined according to the second temperature difference $\Delta T_2$ and the obtained heating rate in the last first fixing process according to Formula (4);

The time axis can be established based on the time length $t_2$ of moving the image to-be-fixed. By inserting the time length $t_3$ of second heating into the time axis, $t_3$ ends earlier than $t_2$ by 0.5 s. According to the $t_3$ in the axis, determining the starting point of $t_3$, and the starting point of $t_3$ is taken as the start time of heating the heater. Meanwhile, the heating of the heater is triggered at the determined start time of heating to make the temperature of the heater reaches the target temperature of fixing within the set time prior to the arrival of the image to-be-fixed at the nip area of fixing assembly.

According to the disclosed steps in above, 0.5 second after the heater is heated to the target temperature of fixing, the piece of paper having the image to-be-fixed, P1, moves to the nip area formed by the heat roller 112 and the pressure roller 113 in the fixing assembly, as shown in FIG. 5. When the piece of paper, P1, passes through the nip area, the ceramic sheet 112A in the fixing film 112C of which the temperature reaches the target temperature of fixing can heat the toner on the paper P1. The pressure roller presses the piece of paper P1 to make the heated and melted toner fused on the piece of paper, generating a printed image.

In the case of considering the heating power percentage and energy loss, the heating time length, $t_1$, corresponding to any temperature ranges of the heater under the current environment of power supply is determined; The temperature difference $\Delta T_1$ between start temperature ($T_{N1}$) and end temperature ($T_{N2}$) of the temperature range as well as the first energy consumption of heating the heater from $T_{N1}$ to $T_{N2}$ are also determined. A voltage parameter $U_1$ of the current environment of power supply is calculated according to the heating time length, $t_1$, the temperature difference $\Delta T_1$ between the start and end temperatures of the temperature range, and the first energy consumption. According to the actual supply voltage $U_1$, the pre-stored table or pre-stored simulation curve paired with $U_1$ is determined. By inputting the temperature difference $\Delta T_2$ into the pre-stored table or projecting the start and end temperatures of the second heating to the pre-stored simulation curve, the time length of second heating, $t_3$, can be further determined. The time axis can be established based on the moving time length $t_2$ of moving the image to-be-fixed. By inserting the $t_3$ into the time axis, $t_3$ ends earlier than $t_2$ by 0.5 s. According to the $t_3$ in the axis, the starting point of $t_3$ is determined and taken as the start time of heating the heater. Meanwhile, the heating of the heater is triggered at the determined start time of heating to make the temperature of the heater reaches the target temperature of fixing within the set time prior to the arrival of the image to-be-fixed at the nip area of fixing assembly.

According to the disclosed steps in above, 0.5 second after the heater is heated to the target temperature of fixing, the piece of paper having the image to-be-fixed, P1, moves to the nip area formed by the heat roller 112 and the pressure roller 113 in the fixing assembly, as shown in FIG. 5. When the piece of paper, P1, passes through the nip area, the ceramic sheet 112A in the fusing film 112C of which the temperature reaches the target temperature of fixing can heat the toner on the paper P1. The pressure roller presses the piece of paper P1 to make the heated and melted toner fixed on the piece of paper, generating a printed image.

Some embodiments further provide a computer-readable storage medium on which a computer program is stored. When the computer program is executed by a processor, the control method disclosed above is implemented for an image forming device.

Those persons of ordinary skill in the art can clearly understand that, for the convenience and brevity of description, the specific operation process of the system, device, and unit described above may refer to the corresponding process in the above embodiments, which will not be repeated here.

In some embodiments of the present disclosure, it should be understood that the disclosed system, apparatus, and method may be implemented in other manners. For example, the embodiments of apparatus described above are only illustrative. For example, the division of the units is only a division in logical function. In actual implementation, there may be other methods of division. For example, multiple units or components are either combined or integrated into another system. Some features are omitted, or not implemented. On the other hand, the demonstrated or discussed mutual coupling, direct coupling, or communication connection are accomplished through some interfaces. The indirect coupling or communication connection of devices or units can be in electrical, mechanical, or other forms.

The units described as separate components may or may not be physically separated. The components displayed as units may or may not be physical units, that is, the units may be located in one place or be distributed to multiple units in network. Some or all of the units may be selected according to actual needs to achieve the purpose of the solution in this embodiment.

In addition, each functional unit in each embodiment of the present disclosure may be integrated into one processing unit, or each unit may exist physically alone, or two or more units may be integrated into one unit. The above-mentioned integrated units can be implemented in the form of hardware or in the form of hardware plus software functional units.

The integrated units implemented in the form of software functional units can be stored in a computer-readable storage medium. The above-mentioned software functional unit is stored in a storage medium and includes several instructions to cause a computer device (e.g., a personal computer, a server, or a network device, etc.) or a processor to execute the methods described in some steps of the various embodiments of the present invention. The aforementioned storage medium includes: U disk, external hard disk, read-only memory (ROM), random access memory (RAM), magnetic disk, optical disk, and other media that can store program codes.

The above descriptions are only preferred embodiments of the present disclosure and are not intended to limit the present disclosure. Any modifications, equivalent replacements, improvements, etc., made within the spirit and principles of the present invention shall be included in the present invention within the scope of protection.

Finally, it should be noted that the above embodiments are only used to illustrate the technical solutions of the present disclosure, but not to limit them; Although the present disclosure has been described in detail with reference to the foregoing embodiments, Those persons of ordinary skill in the art should understand that: the technical solutions described in the foregoing embodiments can still be modified, or some or all of the technical features thereof can be equivalently replaced; These modifications or replacements do not make the essence of the corresponding technical solutions deviate from the technical solutions of the embodiments of the scope of present disclosure.

What is claimed is:

1. A method of heating control applied to an image forming device, wherein the image forming device includes a fixing assembly and a power supply to power the fixing assembly, and the fixing assembly includes a heater and a temperature sensor to detect a temperature of the fixing assembly, the method comprising:

preheating the heater to a first target temperature when the image forming device is powered on, is woken up from sleep, or receives a task to be processed;

calculating a voltage parameter of the heater under a current environment of the power supply or a characteristic of temperature change of a heating process of the heater under the current environment of the power supply according to a prior-preheating temperature, a post-preheating temperature, and a corresponding time length of the preheating; and according to the voltage parameter or the characteristic of temperature change under the current environment of the power supply, determining a heating start time of a second heating for the preheated heater and triggering the second heating at the heating start time, to allow a temperature of the heater to reach a second target temperature within a set time before an image to-be fixed arrives at the fixing assembly.

2. The method of claim 1, wherein calculating the voltage parameter of the heater under the current environment of the power supply comprises:

determining a heating time length $t_1$, corresponding to any temperature range in the heating process of the heater under the current environment of the power supply and a temperature difference $\Delta T_1$ between a start temperature $T_{N1}$ and an end temperature $T_{N2}$ of the temperature range; and calculating the voltage parameter under the current environment of the power supply according to the heating time length $t_1$ and the temperature difference $\Delta T_1$ of the temperature range.

3. The method of claim 2, wherein determining the heating start time of the second heating of the preheated heater according to the voltage parameter comprises:

determining a moving time length $t_2$ of moving the image to-be-fixed to the fixing assembly;

determining a heating time length $t_3$ of the second heating of the heater from a current temperature after being preheated to the second target temperature; and determining the heating start time of the second heating according to a correlation between the heating time length $t_3$ of the second heating and the moving time length $t_2$ of moving the image to-be-fixed.

4. The method of claim 3, wherein determining the heating start time according to a correlation between the heating time length $t_3$ of the second heating and the moving time length $t_2$ comprises:

establishing a time axis based on the moving time length $t_2$ of moving the image to-be-fixed and inserting the heating time length $t_3$ of the second heating into the time axis, allowing the time length $t_3$ to end earlier than the moving time length $t_2$ by a set time; and determining a starting point of the heating time length $t_3$, according to a time length of the heating time length $t_3$ in the time axis, and using the starting point of the heating time length $t_3$ as the heating start time of the second heating.

5. The method of claim 3, wherein determining the heating time length $t_3$ of the second heating of the heater from the current temperature after being preheated to the second target temperature comprises:

determining a temperature difference $\Delta T_2$ between the second target temperature and the current temperature after the heater is preheated; and determining the heating time length $t_3$ of heating the heater from the current temperature after being preheated to the second target temperature according to the temperature difference $\Delta T_2$, when the heater is at the voltage parameter under the current environment of the power supply.

6. The method of claim 1, wherein determining the characteristic of temperature change of the heating process of the heater under the current environment of the power supply according to the prior-preheating temperature, the post-preheating temperature, and the corresponding time length of preheating comprises:

determining the heating time length $t_1$, corresponding to the any temperature range in the heating process of the heater under the current environment of the power supply and the temperature difference $\Delta T_1$ between the start temperature $T_{N1}$ and the end temperature $T_{N2}$ of the temperature range; and matching a pre-stored table or a pre-stored simulation curve in a database with a current voltage feature according to the temperature difference $\Delta T_1$ between the start temperature $T_{N1}$ and the end temperature $T_{N2}$ of the temperature range, and using the matched pre-stored table or matched pre-stored simulation curve as the characteristic of the temperature change, wherein the pre-stored table is configured to store each temperature range and corresponding heating time length during the heating process of the heater under different environments of the power supply, and the pre-stored simulation curve is a temperature change curve of the heater being heated under different environments of the power supply.

7. The method of claim 6, wherein according to the characteristic of temperature change, determining the heating start time of the second heating for the preheated heater comprises:

determining a moving time length $t_2$ of moving the image to-be-fixed to the fixing assembly;

determining a heating time length $t_3$ of heating the preheated heater from the current temperature to the second target temperature according to the matched pre-stored table or the matched pre-stored simulation curve; and determining the heating start time according to a correlation between the heating time length $t_3$ of the second heating and the moving time length $t_2$.

8. The method of claim 7, wherein determining the heating start time according to a correlation between the heating time length $t_3$ of the second heating and the moving time length $t_2$ comprises:

establishing a time axis based on the moving time length $t_2$ of moving the image to-be-fixed and inserting the heating time length $t_3$ of the second heating into the time axis, allowing the time length $t_3$ to end earlier than the moving time length $t_2$ by a set time; and determining a starting point of the heating time length $t_3$, according to a time length of the heating time length $t_3$ in the time axis, and using the starting point of the heating time length $t_3$ as the heating start time of the second heating.

9. An apparatus of heating control applied in an image forming device, comprising:

a processor and a memory;

wherein the memory stores a computer program, and the processor is connected to the memory; and the processor executes the computer program to implement the method of heating control in the image forming device according to claim 1.

10. An image forming device, wherein the image forming device comprising the apparatus of heating control applied in the image forming device of claim 9.

11. A non-transitory computer readable storage medium storing a computer program, wherein the computer program is executed by a processor to implement the method of heating control in the image forming device according to claim 1.

* * * * *